United States Patent [19]

Williams

[11] 4,447,024
[45] May 8, 1984

[54] AIRBORNE VEHICLE

[75] Inventor: Sam B. Williams, Walled Lake, Mich.

[73] Assignee: Williams International, Walled Lake, Mich.

[21] Appl. No.: 346,751

[22] Filed: Feb. 8, 1982

[51] Int. Cl.³ .............................................. B64C 29/00
[52] U.S. Cl. ................................. 244/23 A; 244/4 A; 244/52
[58] Field of Search .................. 244/4 A, 23 A, 23 R, 244/52, 55

[56] References Cited

U.S. PATENT DOCUMENTS

| 2,547,266 | 4/1951 | Hoglin | 244/52 |
| 2,953,321 | 9/1960 | Robertson et al. | 244/52 |
| 3,381,917 | 5/1968 | Moore et al. | 244/4 A |
| 3,434,290 | 3/1969 | Cresswell | 244/52 |

FOREIGN PATENT DOCUMENTS 2346215 10/1977 France ................................. 244/4 A Primary Examiner—Trygve M. Blix
Assistant Examiner—Ivy M. Shum
Attorney, Agent, or Firm—Lyman R. Lyon

[57] ABSTRACT

The disclosure relates to a vehicle that is sustained in flight solely by thrust from a jet engine and directionally controlled by shifting the center of gravity of the vehicle relative to the thrust axis of the engine.

9 Claims, 3 Drawing Figures

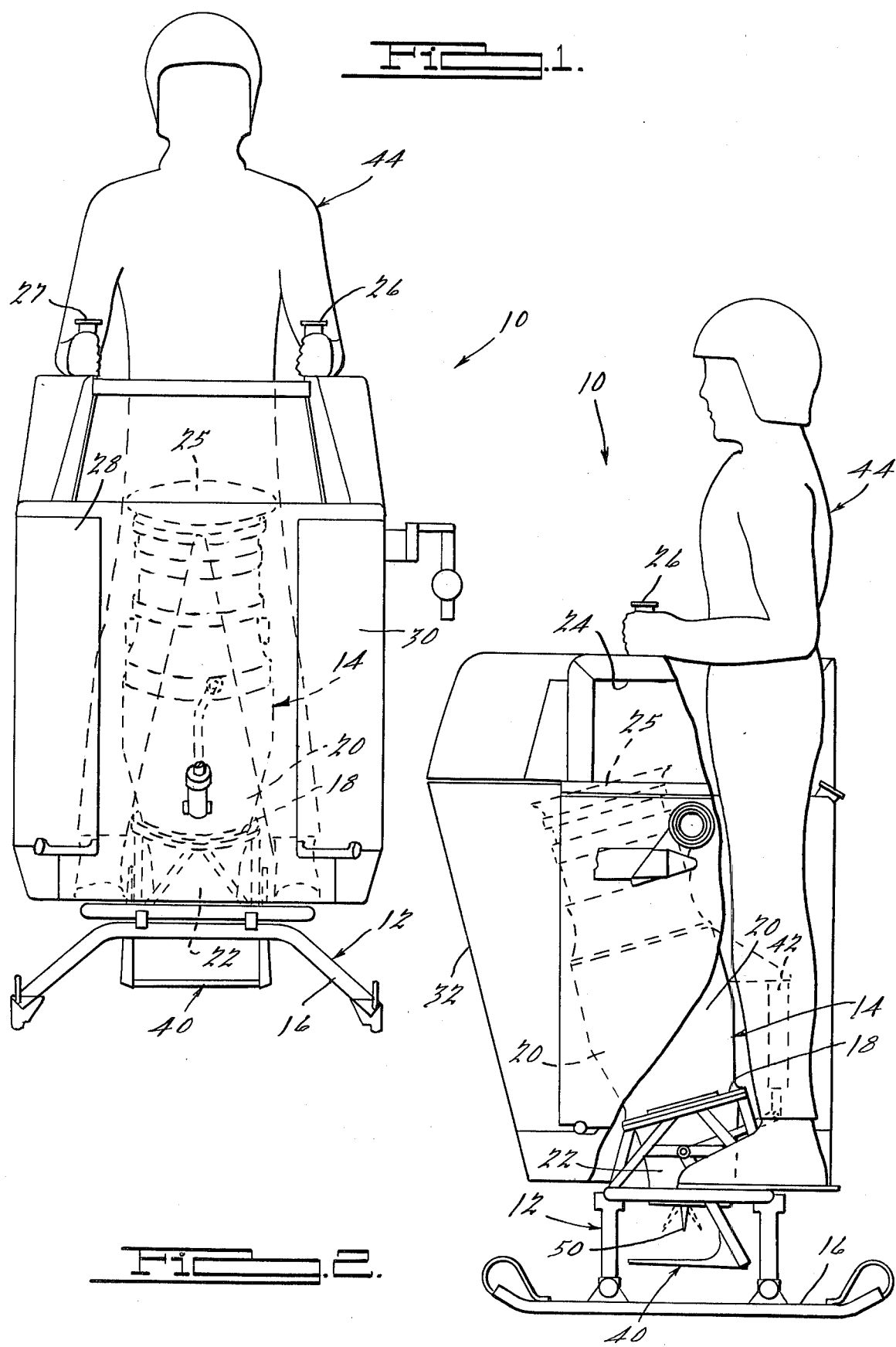

AIRBORNE VEHICLE

BACKGROUND OF THE INVENTION

Lift of an airborne vehicle is ordinarily achieved by movement of air relative to an airfoil. Such relative movement is achieved in a conventional fixed wing aircraft by movement of the aircraft through the air mass. In a helicopter relative movement between an airfoil and the air mass is achieved by movement of the airfoil relative to the vehicle. While airborne vehicles that rely only on thrust for ascent are known, movement in a horizontal plane has not heretofore been achieved by a change in the center of gravity of the vehicle relative to vertical thrust of the engine.

SUMMARY OF THE INVENTION

In accordance with the present invention, thrust of a fanjet engine provides direct lift to an airborne vehicle. The engine is mounted vertically in the vehicle with respect to a fore and aft plane but at a forward leaning angle of approximately 12 degrees with respect to a vertical lateral plane. The exhaust outlet of the engine has a bend of 12 degrees relative to the internal thrust line of the engine in order to direct the jet discharge thereof straight downwardly to facilitate vertical lift. The center of gravity of the vehicle is disposed forwardly of the thrust line to offset the operator's weight which is to the rear of the thrust line. Inclination of the engine provides room for the operator to lean forward for controlling the vehicle. Fuel tanks are located on each side of the vehicle to insure that the center of gravity of the fuel, whether the tanks are full or near empty, lies in a fore and aft plane that includes the thrust line and extends through the center of gravity of the vehicle. The aforesaid positioning of the engine, operator and fuel is an important feature that insures controllability.

In flight, the operator achieves pitch control for forward and rearward flight and roll control for lateral translation by leaning in the desired direction of flight. When the operator shifts his center of gravity forwardly, he moves the center of gravity of the vehicle forward of the thrust line whereupon the vehicle rolls forwardly about a horizontal lateral axis. By adjusting his center of gravity rearwardly, the operator can stop the forward roll and hold the vehicle in a desired forward leaning position at which angle the engine exhaust thrust line is tilted so as to provide a small forward thrust component which accelerates the vehicle in a forward direction. In this manner, highly efficient kinesthetic control of the vehicle is achieved.

BRIEF DESCRIPTION OF THE DRAWINGS

FIG. 1 is a front elevational view of the airborne vehicle of the instant invention;

FIG. 2 is a side elevational view of the airborne vehicle of FIG. 1; and

DETAILED DESCRIPTION OF THE PREFERRED EMBODIMENT OF THE INVENTION

Figure 3:
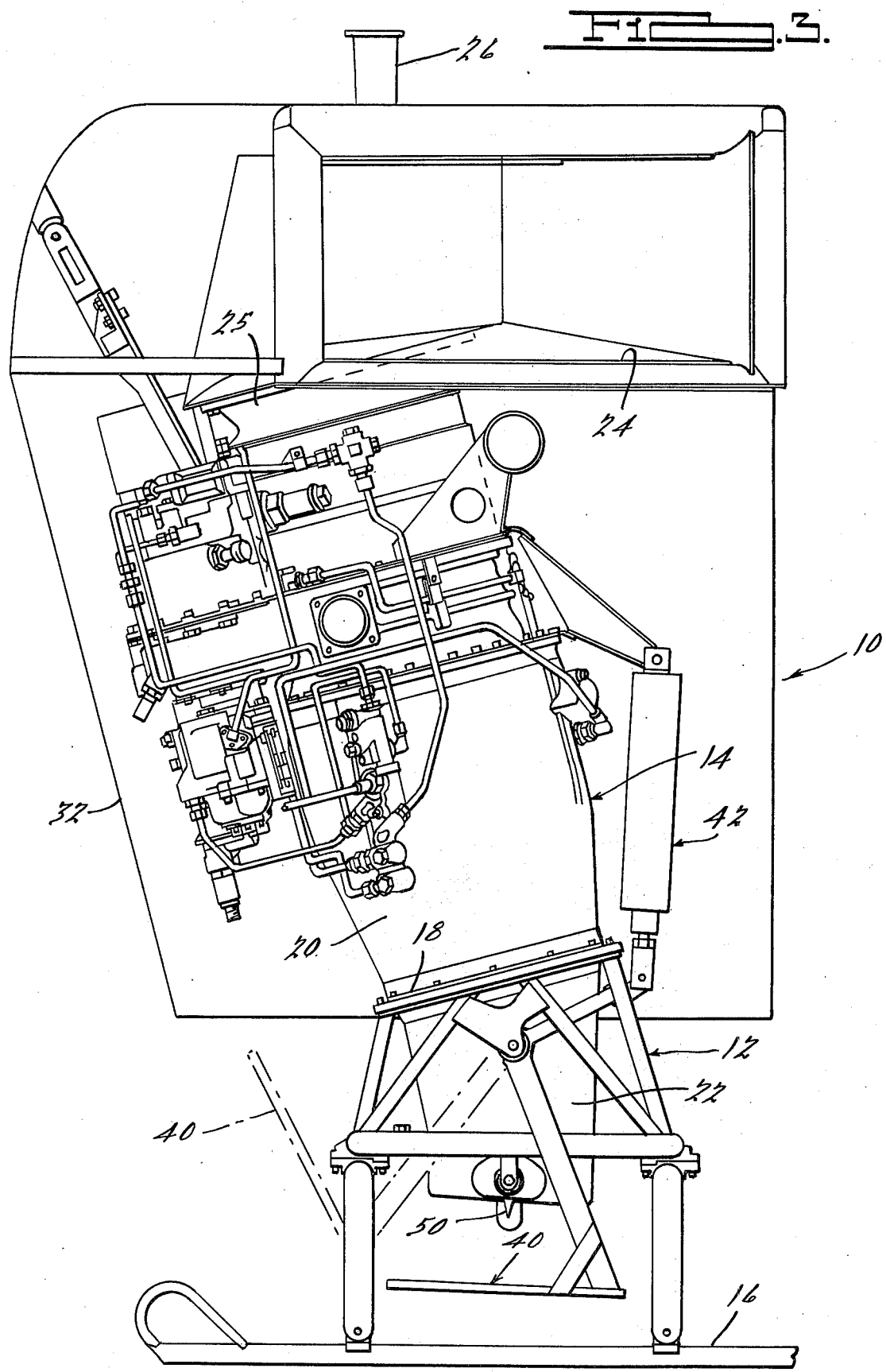
FIG. 3 is a view similar to FIG. 2 with portions removed to better illustrate internal detail of the vehicle.

An airborne vehicle 10 in accordance with a constructed embodiment of the instant invention comprises a tubular aluminum frame 12 for the support of a fan jet engine 14. The frame 12 is provided with a landing gear 16 for the acceptance of ground impact and to stabilize the vehicle 10 on land.

The engine 14 is mounted on the frame 12 above the landing gear 16 by a flange 18 on the lower end 20 of the engine bypass duct and above a jet nozzle 22. The engine 14 serves as the backbone of the vehicle 10 and also supports an ambient air inlet duct 24 which leads to an engine air inlet 25 at the top thereof. A yaw control 26 and engine control 27 are mounted above the inlet duct 24, for control of the vehicle 10, as will be described. Fuel tanks 28 and 30 are supported by the frame 12 and form the streamlined sides of the vehicle 10. An accessory cover 32 at the front attaches to the fuel tanks 28 and 30 and forms the streamlined front end of the vehicle 10.

Erosion or ignition of ground cover under the vehicle 10 is precluded during startup and after landing by a deflector plate 40 that swings into position under the jet nozzle 22 to deflect the high velocity gases radially from the central axis of the jet engine 14 parallel to and above the ground. The deflector plate 40 may be swung into position by the operator, by ground contact, or automatically through air actuators 42. For example, when the fanjet engine 14 compressor discharge pressure drops below a predetermined value, the actuators 42 are conditioned to deploy the deflector plate 40. The deflector 40 remains in position under the vehicle 10 until the engine 14 is started and the thrust thereof is brought from ground idle through flight idle whereupon the compressor discharge pressure increases to a level sufficient to move the deflector plate 40 out of its deployed position and into its stowed position shown in dashed lines in FIG. 3.

The fanjet engine 14 provides for direct lift of the vehicle 10. The engine 14 is mounted vertically in the vehicle with respect to a fore and aft vertical plane but a forward leaning angle of approximately 12 degrees with respect to a transverse vertical plane. The nozzle or exhaust outlet 22 has a bend of 12 degrees in order to direct the jet discharge straight downwardly for vertical lift. Forward lean of the engine 14 positions its center of gravity forwardly of the vertical thrust line which is located generally centrally of the exhaust outlet 22. In this manner the weight of an operator 44, which is to the rear of the center of thrust, is offset. Forward inclination of the engine 14 also provides room for the operator 44 to lean forward for controlling the vehicle 10. The fuel tanks 28 and 30 on each side of the vehicle 10 are located such that the center of gravity of the fuel at all loading conditions is located in the fore and aft plane containing the center of gavity of the vehicle 10. This positioning of the engine 14, operator 44 and fuel tanks 28 and 30 results in the effective center of gravity of the vehicle 10 and operator 44 being on the thrust line of the engine 14.

The operator 44 achieves pitch control of the vehicle 10 for forward and rearward flight and roll control for sideways translation by leaning in the desired direction of flight. When the operator 44 shifts his center of gravity forwardly, he thereby moves the center of gravity of the vehicle 10 forward of the thrust line and the vehicle 10 starts rolling forward. By adjusting his center of gravity rearwardly, the operator 44 can stop the forward roll and hold the vehicle 10 in a desired forward leaning position at which angle the engine thrust line provides a small forward thrust component which accelerates the vehicle in a forward direction.

Directional control of forward flight of the vehicle 10 is achieved by vanes 50 in the jet nozzle region of the engine 14. The vanes 50 are split so as to be actuated in opposite directions to swirl the exhaust of the engine 14 either in a clockwise or counterclockwise direction to cause the vehicle 10 to rotate in a counterclockwise or clockwise direction, respectively. The angle of the yaw vanes is controlled by the twist grip control handle 26 actuated directly by the operator's hand through a conventional flexible cable or push rod control linkage, not shown.

It is to be noted that the ambient air inlets 24 are located on the sides of the vehicle 10 slightly rearwardly of the vertical line of thrust and center of gravity of the vehicle 10. Because the inlet to the engine 25 is forwardly of the center of thrust as a result of engine inclination, it is necessary that the ambient air inlets 24 be located rearwardly of the vehicle 10. This orientation is required because, at high forward flight speeds, there is considerable drag at the screened inlet positions 24 due to the momentum change of the air being accelerated as it enters the inlets 24 on each side of the vehicle 10. If this drag occurred forwardly of the center of gravity and thrust line, the vehicle 10 would be unstable and in forward flight would tend to "weathercock" 180 degrees.

While the preferred embodiment of the invention has been disclosed, it should be appreciated that the invention is susceptible of modification without departing from the scope of the following claims.

I claim:

1. An airborne vehicle comprising a frame for the support of an operator in an erect standing position, and a jet engine mounted on said frame for direct lift of said operator, engine and frame, said frame being attached to the lower end of said engine and said engine constituting the vertically extending backbone of said vehicle, the central axis of said engine being inclined upwardly and forwardly relative to a transverse vertical plane extending through the center of gravity of the vehicle, the center of gravity of said engine being disposed on one side of the thrust line thereof and the center of gravity of said operator being disposed on the opposite side of the thrust line of said engine whereby the center of gravity of said vehicle is on said thrust line when said vehicle is airborne.

2. An airborne vehicle in accordance with claim 1 including an exhaust nozzle having a vertically orientated thrust line.

3. An airborne vehicle in accordance with claim 1 wherein movement of the operator toward said engine effects forward inclination of said vehicle.

4. An airborne vehicle in accordance with claim 1 including means controllable by said operator to effect rotation of the exhaust gases of said engine whereby the reaction force effects rotation of said vehicle about a vertical axis.

5. An airborne vehicle in accordance with claim 4 wherein said means comprises a vane in said exhaust nozzle rotatable about a horizontal axis.

6. An airborne vehicle in accordance with claim 1 comprising an air inlet to said engine having a portion disposed on the operator side of said thrust line.

7. An airborne vehicle in accordance with claim 1 comprising an exhaust deflector at the discharge end of said engine for deflecting the discharge gases radially or axially relative to said thrust line, selectively.

8. An airborne vehicle comprising
a jet engine, and
a frame rigidly attached to the lower end of said engine for the support of an operator in an erect standing posture,
the axis of rotation of the engine turbine being maintained in fixed angular relation to said frame and the thrust of said engine effecting direct lift of said engine, frame and operator,
said engine being inclined angularly upwardly relative to a transverse vertical plane extending through the center of gravity of said vehicle whereby the center of gravity of said engine is disposed on one side of the center of gravity of said vehicle,
the center of gravity of an operator standing erect on said frame being disposed on the other side of said transverse vertical plane from the center of gravity of said engine,
the thrust line of said engine normally lying in said transverse vertical plane and in a fore and aft plane containing the center of gravity of said vehicle, movement of said operator in any direction effecting movement of the center of gravity and inclination of said vehicle in said direction whereby directional control of said vehicle is achieved by movement of operator position.

9. An airborne vehicle in accordance with claim 8 wherein at least a portion of an air inlet for said engine is disposed rearwardly of said transverse plane to preclude weathercocking of said vehicle.

* * * * *